United States Patent [19]

Fu

[11] Patent Number: 5,845,771
[45] Date of Patent: Dec. 8, 1998

[54] CASE FOR COMPACT DISKS

[76] Inventor: Hsin-Yu Fu, No. 36 Lane 266, Fute 1st Rd., Hsichih Chen, Taipei Hsien, Taiwan

[21] Appl. No.: 863,027

[22] Filed: May 23, 1997

[51] Int. Cl.⁶ .......................... B65D 85/57; B65D 51/04
[52] U.S. Cl. .................. 206/308.1; 206/310; 220/337
[58] Field of Search ............................. 206/308.1, 309, 206/310, 311, 312; 270/337, 338, 341

[56] References Cited

U.S. PATENT DOCUMENTS

| | | | |
|---|---|---|---|
| 1,771,289 | 7/1930 | Cooper | 220/337 |
| 4,874,085 | 10/1989 | Grobecker et al. | 206/309 |
| 5,244,085 | 9/1993 | Lammerant et al. | 206/310 |
| 5,246,107 | 9/1993 | Long et al. | 206/309 |
| 5,261,534 | 11/1993 | Krebs et al. | 206/308.1 |
| 5,322,162 | 6/1994 | Melk | 206/310 |
| 5,477,960 | 12/1995 | Chen | 206/308.1 |
| 5,542,531 | 8/1996 | Yeung | 206/308.1 |

*Primary Examiner*—Bryon P. Gehman
*Attorney, Agent, or Firm*—Staas & Halsey

[57] ABSTRACT

A case for a compact disk has an upper cover provided with a number of first bars and a lower cover integrally formed and pivotally connected with the upper cover and provided with a number of second bars alternately displaced with the first bars of the upper cover, such that two compact disks are able to be retained within the case. Furthermore, a plate having a number of first protrusions and second protrusions respectively and alternately displaced with the first bars of the upper cover and the second bars of the lower cover is able to be pivotally secured between the upper cover and the lower cover, so that two more compact disks are able to be retained within the case.

4 Claims, 6 Drawing Sheets

5,845,771

CASE FOR COMPACT DISKS

FIELD OF THE INVENTION

The present invention generally relates to a case for compact disks, and more particularly, to a case whose thickness is the same as a conventional one, yet, the capability of storing compact disks increases greatly.

BACKGROUND OF THE INVENTION

After the invention of the compact disk (CD), people found it very convenient for accessing information as well as easy to store and carry. With this competitive advantage, CDs occupy a large portion of the information market. Due to the large demand for CDs, the mass production of CDs creates a problem which is that people have to find a proper way to store all the CDs. Accordingly, a conventional case 50 for storing a CD (not shown) is shown in FIG. 7. The case 50 comprises a first cover 51 and a second cover 53 pivotally connected with the first cover 51. The second cover 53 is configured to receive a plate 55 having a recess 551 defined therein and having formed a circular protrusion 552 in a center thereof. The CD (not shown) is formed as a disk having a central through hole (not shown) defined therein and a diameter of the central through hole is slightly smaller than that of the circular protrusion, when the CD is placed within the recess 551 and onto the circular protrusion 552, pressing of the CD will deform the circular protrusion 552 and the circular protrusion 552 will extend into the through hole of the CD and securely retain the CD by abutting a periphery of the through hole. FIG. 7 shows that the case 50 can only accommodate one CD, and the plate 55 is very different in shape and material from both the first cover 51 and the second cover 53 so that the plate 55 has to be produced in another production line, which will increase the cost. Furthermore, since the plate 55 is manufactured differently compared to the first cover 51 and the second cover 53, manual installation of the plate 55 with the first and the second cover 51, 53 is necessary, which increases labor cost.

From the previous description, the case 50 which is available in the market, having a first cover 51, a second cover 53 pivotally connected with the first cover 51 and a plate 55 securely connected with the second cover 53, is not able to fulfill the needs of users and improvements or alterations thereof are thus required. A case constructed in accordance with the present invention tends to mitigate and/or obviate the aforementioned problems.

SUMMARY OF THE INVENTION

The main object of the invention is to provide a compact disk case which has the same thickness as a conventional CD case, but can accommodate two CDs.

Another object of the invention is to provide a compact disk case having an upper cover and a lower cover integrally and pivotally connected with the upper cover. Each of the upper cover and the lower cover is provided with a plurality of first and second protruded bars at a respective center position thereof. The bars of the upper cover and the lower cover are respectively formed to have a circular shape and the bars are so equally spaced apart that the bars of the upper cover and the bars of the lower cover are respectively and alternately displaced to provide a snug fit with each other when the upper cover and the lower cover are closed together. Due to the provision of the bars onto the upper cover and the lower cover, two CDs are able to be respectively stored onto the upper cover and the lower cover of the case constructed in accordance with the present invention.

Another object of the invention is to provide a compact disk case having an upper cover, a lower cover integrally formed and pivotally connected with the upper cover and two retainers each of which are formed on an end of a junction of the upper cover and the lower cover, so that an attachment having a size smaller than that of the case and provided with a first side face and a second side face is able to be held between the two retainers. The attachment is configured to have a plurality of protrusions integrally formed onto the first side face and the second side face. The protrusions of the first side face and the second side face are formed to have a circular shape and are so equally spaced that protrusions of the first side face and the second side face and the bars of the upper cover and the lower cover are alternately displaced to provide a snug fit with each other when the upper cover and the lower cover are closed with the attachment displaced therebetween. Due to the provision of the attachment between the upper cover and the lower cover, and the alternate displacement of the bars and the protrusions, the case of the invention is able to be used to store up to four CDs and the thickness of the case remains the same as a conventional one.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENTS

Figure 1:
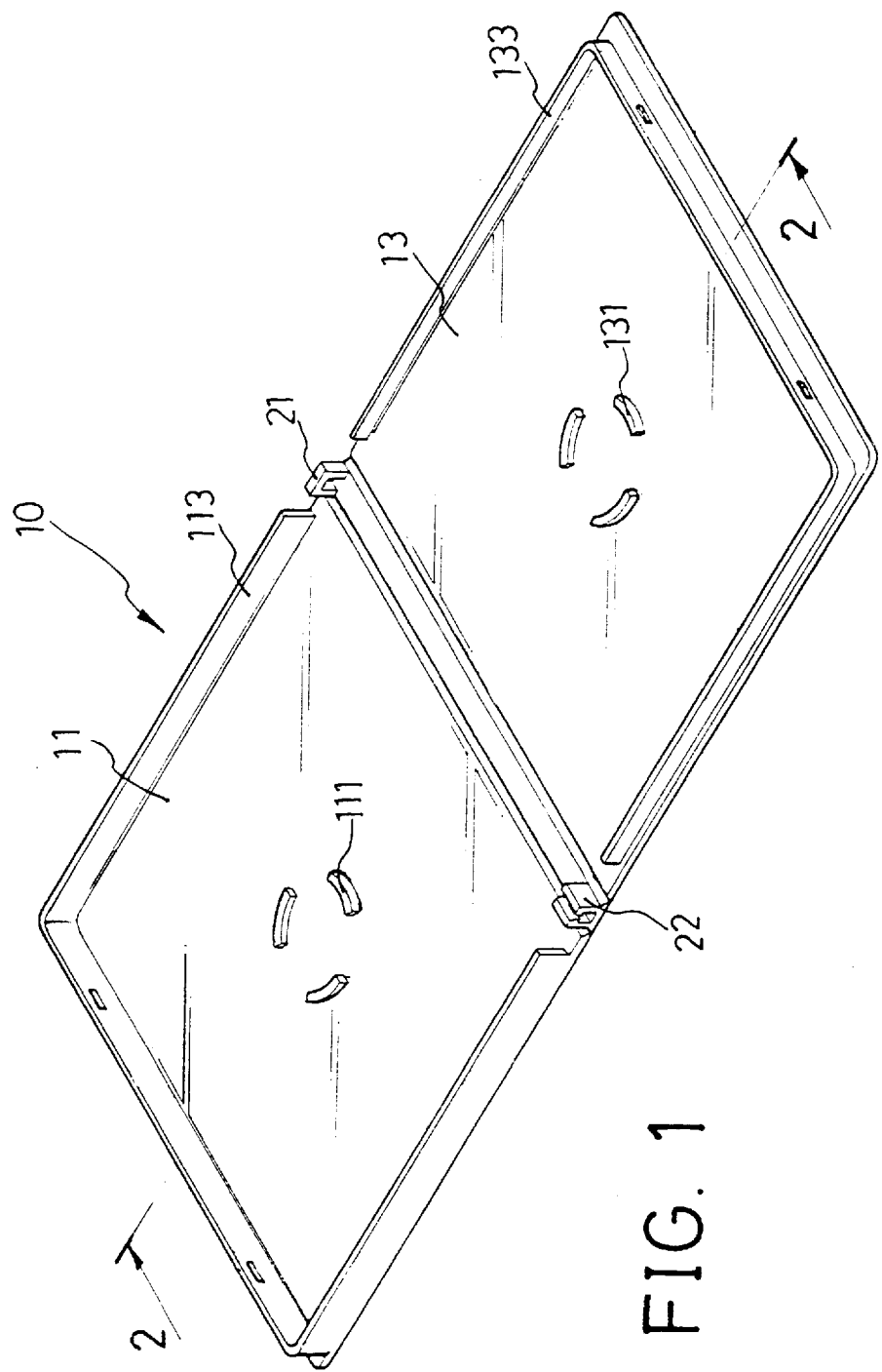
FIG. 1 is a perspective view of a CD case constructed in accordance with a first embodiment of the present invention.

Referring to FIG. 1, a first embodiment of a compact disk (CD) case 10 constructed in accordance with the present invention is shown. The case 10 is configured to have an upper cover 11 and a lower cover 13 integrally and pivotally connected with the upper cover 11. The upper cover 11 is provided with a first flange 113 along a periphery thereof, and the lower cover 13 is provided with a second flange 133. The first flange 113 and the second flange 133 are so dimensioned that the first flange 113 encloses the second flange 133 when the upper cover 11 and the second cover are closed together. A plurality of first bars 111, and a plurality of second bars 131, each plurality forming a circular shape, are integrally formed onto the upper cover 11 and the second cover 13 and the first bars 111 and the second bars 131 are alternately displaced with each other so that when the upper cover 11 and the lower cover 13 are closed together (not shown), the first bars 111 provide a snug fit with the second bars 131.

Figure 2:
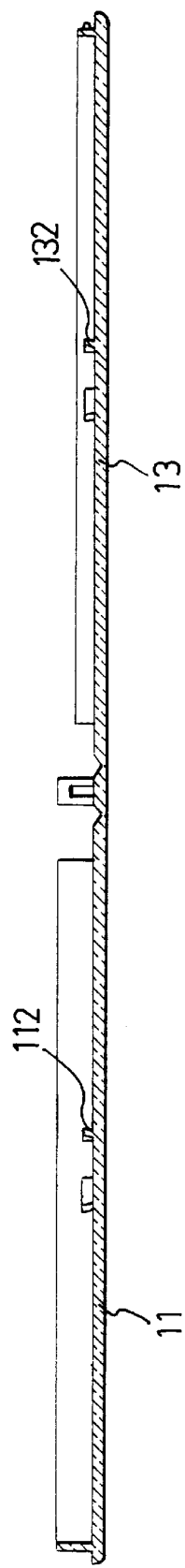
FIG. 2 is a cross sectional view of FIG. 1 in view of line 2—2.
Figure 3:
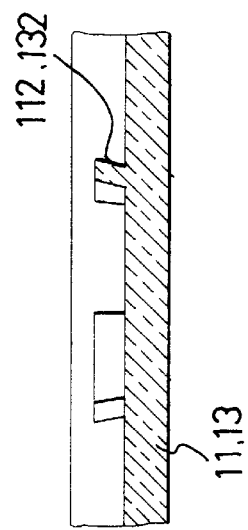
FIG. 3 is a partial enlargement of FIG. 2.

Referring to FIGS. 2 and 3, a cross-section of either the first bars 111 or the second bars 131 are formed to each have beveled side faces 112, 132 respectively. Due to both of the first bars 111 and the second bars 131 being made of elastic material, such as plastic, the provision of the beveled side faces 112, 132, and an outside diameter of the circular shape of the first bars 111 and the second bars 131 being slightly bigger than that of the diameter of a central through hole (not shown) of a compact disk, both the first bars 111 and the second bars 131 can readily extend through the central through hole of the CD and thus retain the CD in position.

Figure 4:
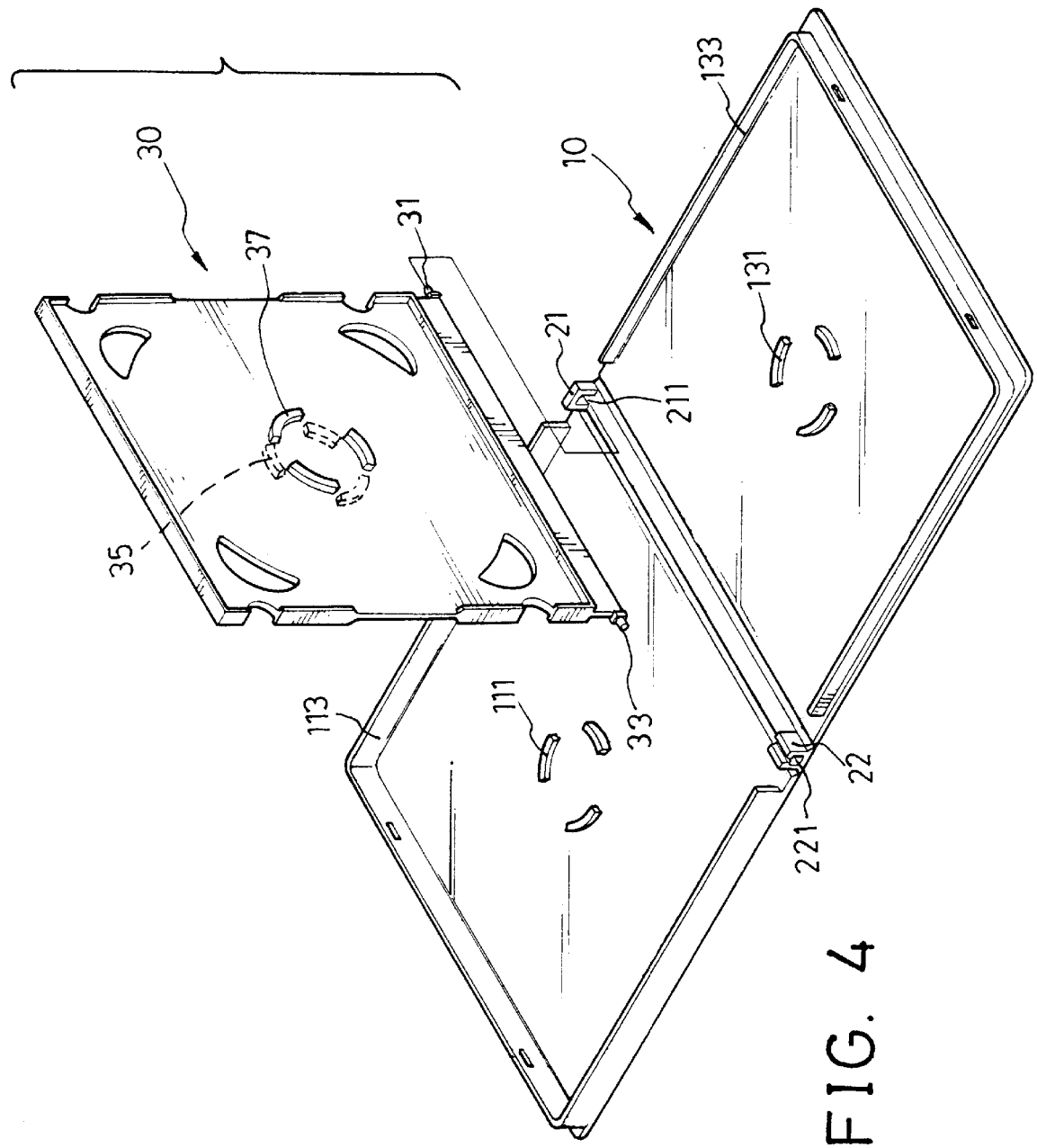
FIG. 4 is a perspective view of a CD case constructed in accordance with a second embodiment of the present invention.
Figure 5:
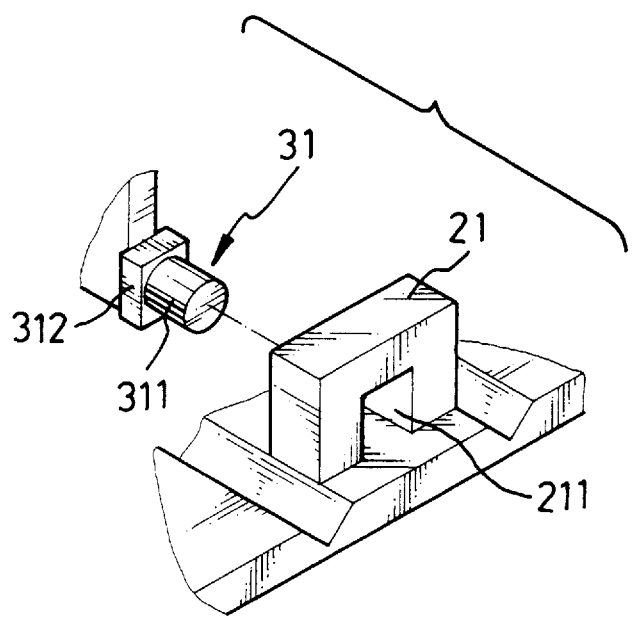
FIG. 5 is a partial enlargement of FIG. 4.

Referring to FIGS. 1 and 4, a second embodiment of the present invention is shown. The previously described CD case 10 further has a first retainer 21 and a second retainer 22 each respectively formed at an opposite edge of a junction of the upper cover 11 and the lower cover 13. The first retainer 21 is a closed rectangular shape having an opening 211 defined therein and the second retainer is formed to have a cutout 221. Furthermore, a plate 30, having on opposite ends of a bottom edge a first extension 31 and a second extension 33, is able to be releasably secured between the first retainer 21 and the second retainer 22 via inserting the first extension 31 into the opening 211 of the first retainer 21 and disposing the second extension 33 into the cutout 221 of the second retainer 21. The first extension 31 has a first part 311 and a second part 312 integrally formed with the first part 311 (as shown in FIG. 5). The first part 311 is circularly shaped and the second part 312 is shaped corresponding to the shape of the opening 211 of the first retainer 21, such that when only the first part 311 of the first extension 31 is inserted into the opening 211 of the first retainer 21, and the second extension 33 is displaced within the cutout 221 of the second retainer 22, the plate 30 is able to pivot. The plate 30 has a first side face (not numbered) having a plurality of first protrusions 35 formed in a circular shape and alternately disposed with the first bars 111 of the upper cover 11 and a second side face (also not numbered) having a plurality of second protrusions 37 formed in a circular shape and alternately disposed with the second bars 131 of the lower cover 13, such that both of the first bars 111 and the second bars 131 will provide a snug fit respectively with the first protrusions 35 and the second protrusions 37 when the upper cover 11 and the lower cover 13 are closed together. Due to the provision of the plate 30, the first protrusions 35 and the second protrusions 37 thereof, the CD case 10 of the present invention is able to contain 4 CDs and still have the same thickness as a conventional CD case.

Figure 6:
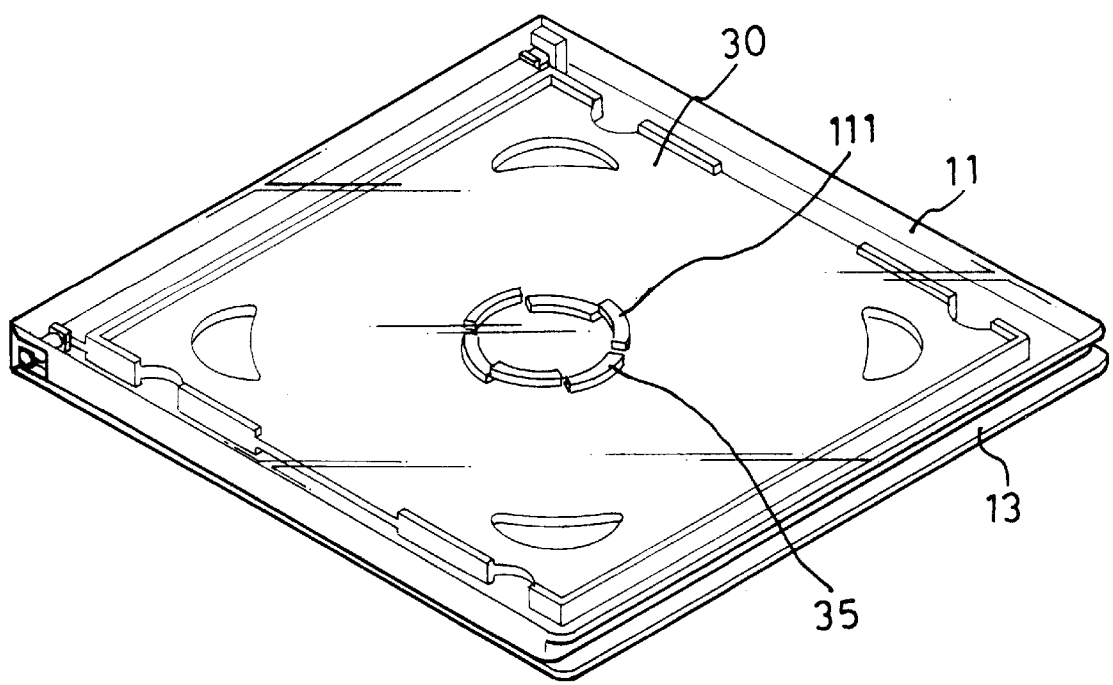
FIG. 6 is another perspective view of the present invention showing a displacement of bars and protrusions respectively formed onto an upper cover and an attachment.
Figure 7:
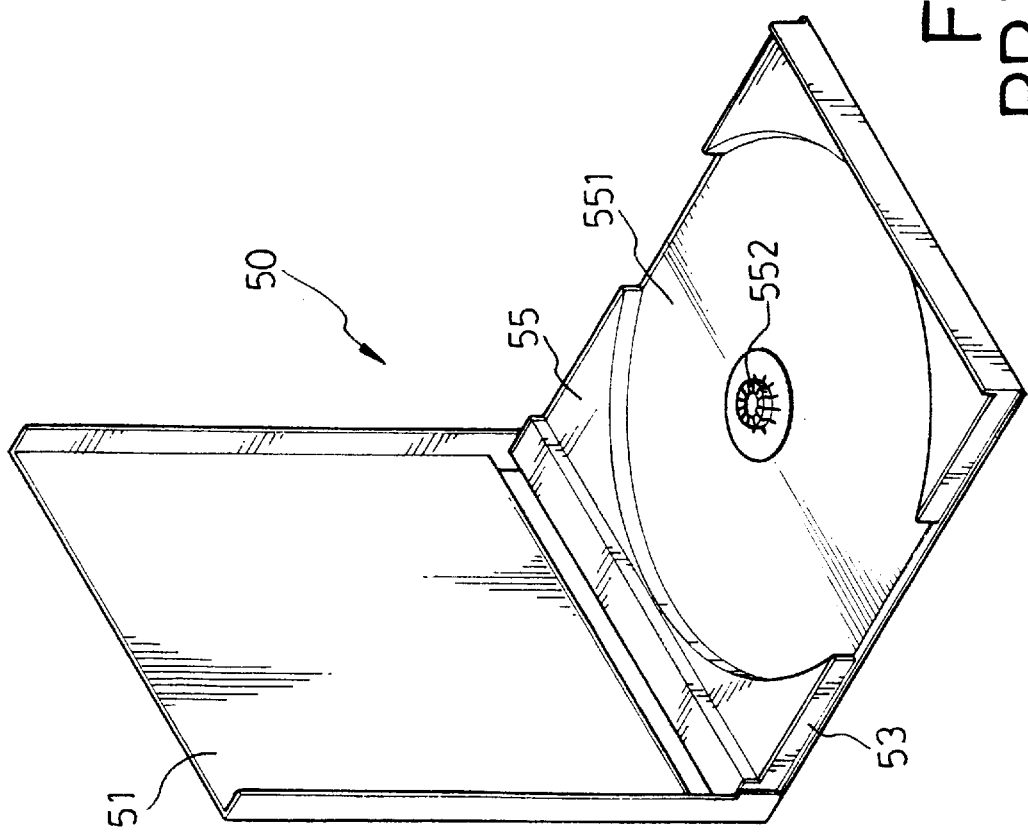
FIG. 7 is a perspective view of a conventional CD case

FIG. 6 shows that when the CD case 10 is closed, due to the alternate displacement of the first bars 111 of the upper cover 11 with the first protrusions 35 of the first side face of the plate 30, the thickness of the case 10 will not be increased, but the capability of the case 10 to contain more CDs increases.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A case for receiving compact disks including an upper cover and a lower cover integrally and pivotally connected with said upper cover, comprising:

a plurality of first bars integrally formed onto said upper cover and equally spaced apart from each other to form a circular shape, to store a first optical disk onto the upper cover;

a plurality of second bars alternately displaced with respect to said first bars and integrally formed onto said lower cover and equally spaced apart from each other to form a circular shape, to store a second optical disk onto the lower cover; and a first retainer having a rectangular opening defined therein and a second retainer having a cutout defined therein, said first and second retainers being respectively mounted at opposite ends of a junction between said upper cover and said lower cover.

2. A case for receiving compact disks, comprising:

an upper cover and a lower cover integrally and pivotally connected with said upper cover;

a plurality of first bars integrally formed onto said upper cover and equally spaced apart from each other to form a circular shape, to store a first optical disk onto said upper cover;

a plurality of second bars alternately displaced with respect to said first bars and integrally formed onto said lower cover and equally spaced apart from each other to form a circular shape, to store a second optical disk onto said lower cover;

a first retainer having a rectangular opening defined therein and a second retainer having a cutout defined therein, said first and second retainers respectively formed at opposite ends of a junction of said upper cover and said lower cover; and a plate having a first side face integrally provided with a plurality of first protrusions, a second side face integrally provided with a plurality of second protrusions, a first extension releasably inserted into said opening of said first retainer and a second extension attachably received within said cutout of said second retainer, said first and second extensions integrally formed at respective opposite ends of a bottom face of said plate and respectively each having a first part and a second part configured to have a shape corresponding to that of said rectangular opening, said plurality of first protrusions to store a third optical disk onto the first side face of said plate and said plurality of second protrusions to store a fourth optical disk onto the second side face of said plate.

3. The case for receiving compact disks as claimed in claim 2, wherein said first protrusions are alternately displaced with said first bars of said upper cover and said second protrusions are alternately displaced with said second bars of said lower cover.

4. A case for receiving compact disks, comprising:

an upper cover having a plurality of equally spaced first bars, said first bars to retain a first optical disk to said upper cover;

a lower cover integrally and pivotally connected with said upper cover and having a plurality of equally spaced second bars alternately displaced with respect to said first bars, said second bars to retain a second optical disk to said lower cover;

a first retainer having a rectangular opening defined therein and a second retainer having a cutout defined therein, wherein said first retainer and said second retainer are mounted at respective opposite ends of a junction between said upper cover and said lower cover.

* * * * *